(12) United States Patent
Gustafson (10) Patent No.: US 8,713,827 B2
(45) Date of Patent: May 6, 2014

(54) ADVERTISING DEVICE AND METHOD

(76) Inventor: David R. Gustafson, Plymouth, MN (US)

( * ) Notice: Subject to any disclaimer, the term of this patent is extended or adjusted under 35 U.S.C. 154(b) by 0 days.

(21) Appl. No.: 11/827,011

(22) Filed: Jul. 9, 2007

(65) Prior Publication Data

US 2008/0006693 A1 Jan. 10, 2008

Related U.S. Application Data

(60) Provisional application No. 60/819,299, filed on Jul. 10, 2006.

(51) Int. Cl.
*G09F 15/00* (2006.01)

(52) U.S. Cl.
USPC .................................................. 40/606.04

(58) Field of Classification Search
USPC ............... 40/607.11, 611.01, 438, 606.04, 40/606.06, 319, 661, 654.01, 609, 606.19, 40/593; 232/38
See application file for complete search history.

(56) References Cited

U.S. PATENT DOCUMENTS

| | | | |
|---|---|---|---|
| 2,297,574 A | 9/1942 | McCord | |
| 3,740,881 A * | 6/1973 | Finger | 40/609 |
| 3,956,837 A * | 5/1976 | Itano | 40/745 |
| 4,144,664 A | 3/1979 | De Kort | |
| 4,176,486 A | 12/1979 | Williams | |
| 4,263,737 A | 4/1981 | Simon | |
| 4,318,496 A | 3/1982 | Spring | |
| 4,454,670 A * | 6/1984 | Bachmann et al. | 40/584 |
| 4,765,076 A | 8/1988 | Sada | |
| 5,018,291 A | 5/1991 | Pasquale | |
| 5,207,349 A | 5/1993 | Kringel | |
| 5,209,004 A | 5/1993 | Kirlin | |
| 5,374,116 A | 12/1994 | Borgen | |
| 5,445,287 A * | 8/1995 | Center et al. | 221/1 |
| 5,535,130 A * | 7/1996 | Long | 700/231 |
| 5,613,620 A | 3/1997 | Center et al. | |
| 5,647,154 A * | 7/1997 | Groves | 40/584 |
| 5,800,027 A * | 9/1998 | Dunn | 312/138.1 |
| 5,894,931 A * | 4/1999 | Dunn | 206/555 |
| 6,078,896 A * | 6/2000 | Kaehler et al. | 705/14.65 |
| 6,089,975 A * | 7/2000 | Dunn | 463/16 |
| 6,128,842 A | 10/2000 | Lotspeich | |
| 6,550,168 B1 | 4/2003 | Campos | |
| 6,578,301 B1 * | 6/2003 | Ericson | 40/606.18 |

(Continued)

OTHER PUBLICATIONS

NPL Literature George Patton Associations, Inc Dec. 2, 2005.*

(Continued)

*Primary Examiner* — Joanne Silbermann
(74) *Attorney, Agent, or Firm* — LeonardPatel PC; Michael A. Leonard, II; Sheetal S. Patel (57) ABSTRACT

An advertising device and method with an advertising display that comprises a sign holder mounted on the side or top of the vending machine in a position projecting upwardly from the top or laterally from the side so as to extend outwardly from the surface of the vending machine. Each sign holder supports removable print advertising or electronic video display advertising and holds the advertising display in a position facing forwardly toward a location taken by a customer when the customer is located in front of the vending machine. In this way, the customer's primal instinct attracts the customer into proximity to the advertising display and places the customer in a position that facilitates reading the advertising display so as to induce the customer to respond to the advertising display.

15 Claims, 5 Drawing Sheets

(56) References Cited

U.S. PATENT DOCUMENTS

| | | |
|---|---|---|
| 6,834,452 B2 | 12/2004 | Martin |
| 6,962,284 B1 * | 11/2005 | Hartelius et al. ............... 232/38 |
| 6,968,959 B1 * | 11/2005 | Garvin ............................ 211/50 |
| 7,020,992 B1 * | 4/2006 | Christie .......................... 40/593 |
| 7,233,912 B2 | 6/2007 | Walker |
| 2006/0101690 A1 * | 5/2006 | Terbet, Jr. ................. 40/607.09 |

OTHER PUBLICATIONS

Fasteners for Retail 2002 catalog item TVE-8114 T-style easel sign holder with pocket.*

Fateners for Retail catalog 1995 p. 16 item 110-100R Super Grip Sign Holder.*

* cited by examiner

ADVERTISING DEVICE AND METHOD

Applicant claims the benefit of provisional application Ser. No. 60/819,299, filed Jul. 10, 2006, bearing the title ADVERTISING DISPLAY AND METHOD which is incorporated herein by reference.

FIELD OF THE INVENTION

The invention relates to an advertising device and method and more particularly to an advertising device and method for print or electronic advertising.

BACKGROUND OF THE INVENTION

In recent years, the field of alternative advertising has become more competitive, and is expanding but the limited size of the audience and audience response has restricted potential growth in this area. Accordingly, the need exists for a novel way of increasing the audience gaining customer attention, interest and motivation as a basis for greatly improved customer response as measured by the percentage of customers who observe and respond to the advertising as well as providing expanded business volume.

U.S. Pat. No. 5,209,004 describes a weatherproof display device mounted on a newspaper vending machine. The patent provides a vertical support member that places a housing for printed material at a distance of about 9" above and behind the vending machine. There is no provision for mounting a support for the printed material perpendicular to a side or above the top surface of the vending machine. U.S. Pat. No. 4,144,664 shows a transparent cover for printed material that is supported by two parallel laterally spaced apart triangular reinforcing struts connected to a mounting base located a few inches below the transparent cover. Consequently, printed material within the transparent cover panel must be spaced away from the surface of the vending machine and the device is unable to accommodate pointed material of various thicknesses. Prior vending machines have another shortcoming; because a message is easily forgotten, it is difficult for the customer to respond.

In view of the deficiencies of the prior art, it is one object of the invention to find a novel way of gaining a customer's initial attention as well as improving customer response to an advertisement.

Another object of the invention is to provide an advertising device and method that is unusually economical as measured by a ratio of advertising cost to customer response.

Yet another object of the invention is to provide an advertising device and method that is rugged in construction, reliable in operation, easy to set up and maintain, and lends itself to convenient removal and replacement of printed or electronic advertising copy.

These and other more detailed and specific objects and advantages of the present invention will be better understood by reference to the following figures and detailed description which illustrate by way of example but a few of the various forms of the invention within the scope of the appended claims.

SUMMARY OF THE INVENTION

This invention relates to an advertising device and method having a display for goods or services such as real estate, travel, boating, homes, flight reservations, etc. To attract the customer and induce a response, the advertising display is attached to a vending machine containing candy or snacks unrelated to the advertising display. One aspect of the invention concerns a combination food vending device and advertising display that includes a vending machine for candy or other snack. Another aspect concerns an advertising display comprising a sign holder mounted on the side or top of the vending machine in a position projecting upwardly from the top or laterally from the side so as to extend outwardly from the surface of the vending machine. Each sign holder supports removable print advertising or electronic video display advertising for goods or services unrelated to the vending machine and holds the advertising display in a position facing forwardly toward a location taken by a customer when the customer is buying the candy or other snack from the vending machine. In this way, the customer's hunger instinct attracts the customer into proximity to the advertising display and places the customer in a position that facilitates reading the advertising display so as to induce the customer to respond to the advertising display for goods or services that are not related to the vending machine which attracted the attention of the customer. Another aspect of the invention is the provision of a dispenser placed adjacent to each advertising display for a card or other printed indicia that can be taken home by the customer.

DETAILED DESCRIPTION OF PREFERRED EMBODIMENTS

The science of psychology has recently revealed new insights into the origin of human motivation. Many human motives such as a motivation to attend college or study science are based on learning and environmental factors which involve thought processes that take place in the higher centers of the brain, such as the frontal cortex, the seat of cognitive functions. However, there are primal aspects of human behavior which are controlled by more primitive parts of the brain, such as the hypothalamus, a small structure at the base of the brain that is involved in regulating hormone production and controlling basic behaviors such as hunger, thirst, and sex, as well as the amygdala, a center that responds to emotionally arousing information or to anything that gets the heart pumping. The instincts relating to hunger and thirst are thus regulated in the hypothalamus; a brain center that evolved millions of years ago and was present in animal organisms at a time before mammals existed and was highly developed even in reptiles—therefore sometimes referred to as the reptilian brain. One aspect of the invention is to take advantage of primitive brain centers by utilizing fundamental needs that are controlled by a center that governs basic instincts to arouse a customer's attention and interest and to elicit a response. According to the present invention this objective is achieved by taking advantage of an instinctive need for food, particularly an instinctive craving for carbohydrates or foods high in carbohydrates such as candy and snacks to initially draw a person's attention to an advertisement and to induce him to approach the advertisement closely so that the advertisement is in easy reading distance. In accordance with the invention, a candy or a snack vending machine is provided that displays the candy or other snack or a picture of it. Mounted on the side or top of the candy vending machine is an advertising display facing a position at the front of the vending machine where the customer stands when using the machine. In this way the customer is placed in the best position to view the advertisement while looking at or buying the candy or other snack. Consequently, this aspect of the invention takes particular advantage of an instinctive interest in and hunger for carbohydrates, to draw attention to the advertisement and to place the customer where she can readily view the advertising and is able to read it easily.

Another preferred but optional aspect of the invention is the provision of a dispenser for cards or other printed material concerning an advertisement positioned in proximity to the ad and to the food for enabling the customer to more easily respond to the ad by providing him with a card having the address, phone number, etc., of the advertiser. The card, which for convenience can be referred to as a "take-away card", has a superficial resemblance to a calling card with two differences: 1) it refers to the ad and most preferably is itself a miniature version of all or part of the ad, and 2) it can, if desired, have a picture of candy or an offer referring to candy to again take advantage of the hunger instinct to help motivate a person to take a card. Thus, a preferred form of sign holder includes a dispenser positioned in proximity to the advertisement to contain a card or other printed indicia. Each card is exposed by the dispenser in a position to be grasped by the customer and taken away to thereby facilitate a response to the advertisement. The term "dispenser" herein means a holder for printed cards or other printed articles that facilitates removal by a potential customer so that the article can be taken away after viewing an advertisement located adjacent to the dispenser. The term "miniature version" means a smaller size copy of the advertisement containing at least one feature or fact in common with the advertisement; preferably information which enables a potential customer to contact the advertiser. One preferred form of sign holder has a free edge on one end and on the opposite end a supporting stabilizer that extends laterally and includes a connector for removably connecting the holder to the vending machine.

Figure 1:
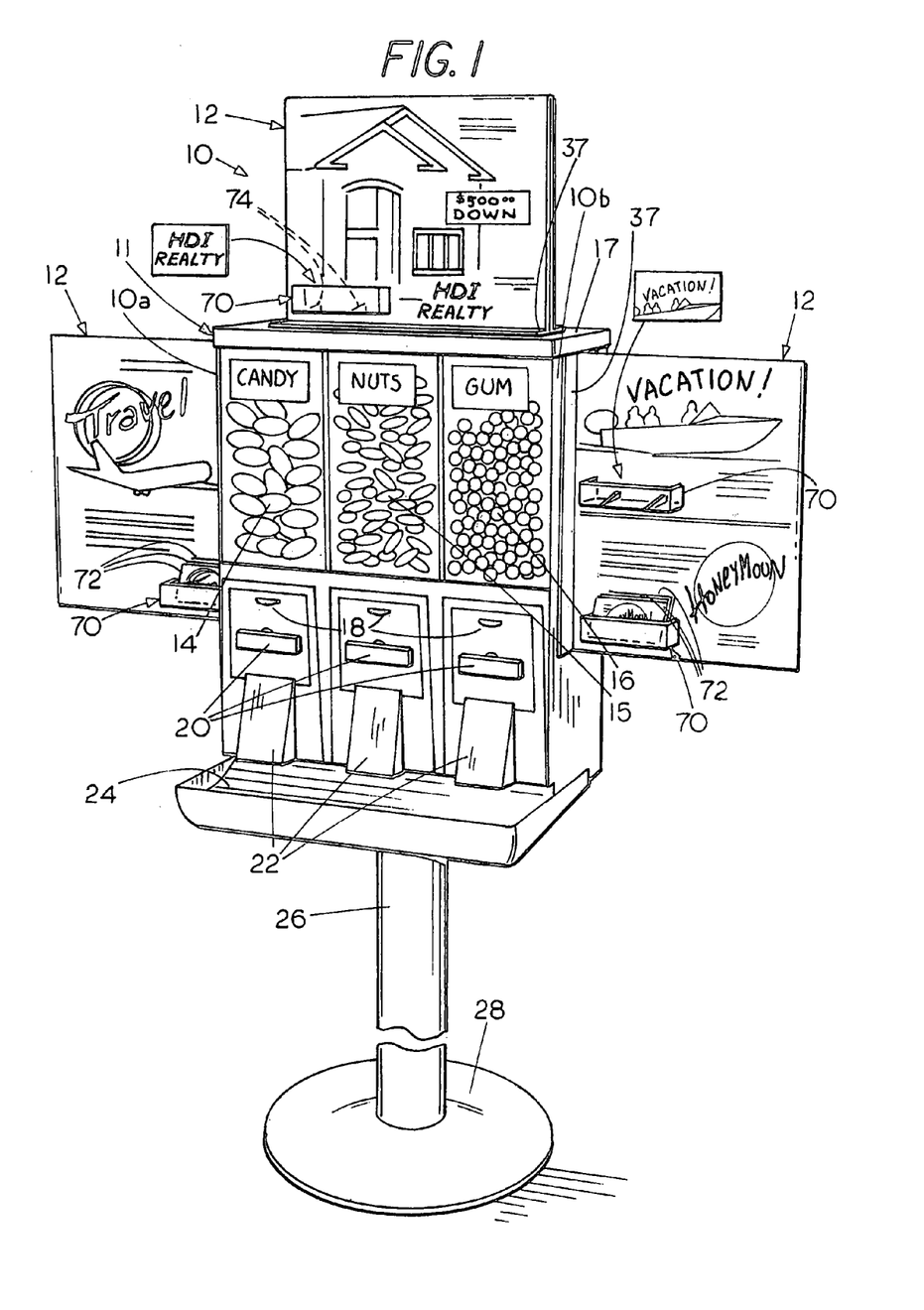
FIG. 1 is a perspective view of the combination vending machine and advertising display of the invention.
Figure 2:
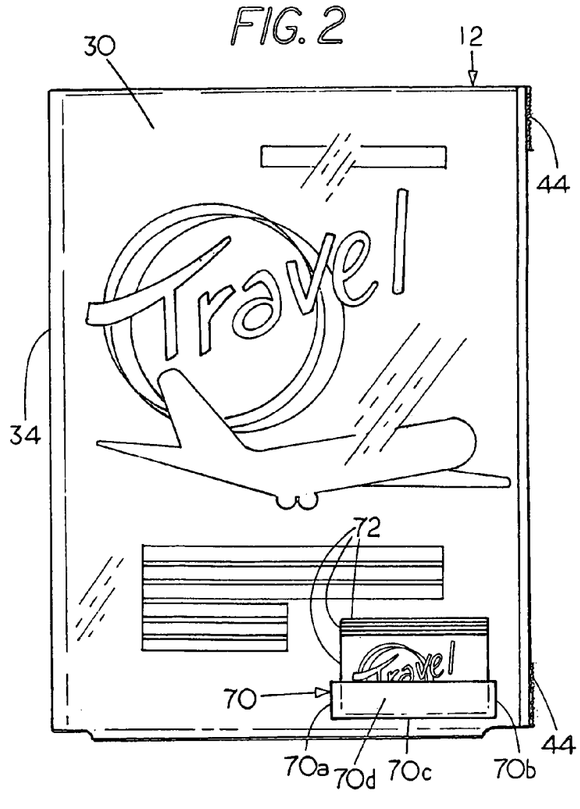
FIG. 2 is an elevational view of the advertising display of FIG. 1 on a larger scale.

Refer now to the Figures, and particularly to FIGS. 1-4 which illustrate a combination vending machine and advertising display 10 in which the vending machine designated 11 is a candy or snack vending machine that includes compartments 14-16, in this case for candy, nuts, and gum respectively which is held in transparent canisters within the vending machine 11. The term "snack" herein means any of the following: candy, gum, nuts, chips, e.g. potato chips, banana chips, etc., crackers, pretzels, or other dry cereal based food compositions, cookies, or dried meat. Some candy suppliers may also include toys or trinkets with the candy. Each of the canisters 14-16 has a clear transparent wall on the front of the machine as shown in FIG. 1 to provide a clear view of the snack. However, if desired, in the alternative, a pictorial representation of the candy or other snacks can be provided. The vending machine also has coin slots 18 and turn cranks 20 which when rotated dispenses the candy or other snacks through outlet chutes 22 into a spill tray 24 where the candy or other snack can be picked up by the consumer. The vending machine 11 is supported on a stand 26 having a pedestal 28 at its lower end that is placed on the floor. All of the canisters 14-16 are covered by a lock and key lid 17 which, in this instance, comprises the top of the machine.

Figure 3:
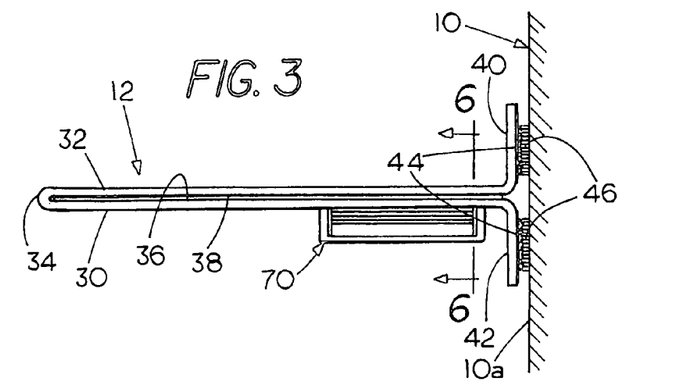
FIG. 3 is a plan view of FIG. 2.
Figure 4:
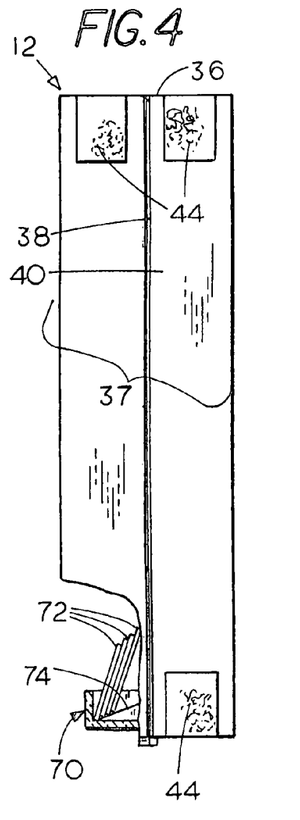
FIG. 4 is an end elevation of FIG. 2.

Projecting outwardly, i.e. at right angles to the top surface or from one or both of the side surfaces are advertising displays 12, each comprising a sign holder that is removably attached to the outside surfaces of the vending machine 11. The sign holders 12 (best seen in FIGS. 2-4) in this case each include front and rear panels 30 and 32 formed from a single sheet of plastic resin such as acrylic resin, e.g. about ⅛" in thickness having a free outer edge 34 comprising a 180° bend in the plastic sheet to provide a compartment 36 between the panels 30 and 32 for a rectangular sheet of printed advertising material 38. Opposite the free end 34 of the sign holder 12 is a stabilizer 37 which comprises coplanar end portions of the plastic sheet material including a rearwardly extending stabilizer portion 40 and a forwardly extending portion 42 each formed from the end portions of the panels 30 and 32 that are flared laterally to serve as a rear stabilizer 40 and a front stabilizer 42. Because compartment 36 is open between the stabilizers 40 and 42, it can be seen that the printed advertising sign 38 is able to extend adjacent to the surface 10a of the vending machine 10 as best seen in FIG. 3, but need not necessarily be able to contact the vending machine. In this way, the sign holders 12 are very efficient in displaying signs having a maximum area throughout the sign holder 12 and even adjacent to the wall of the vending machine 11 so that none of the space around the vending machine remains unused for advertising purposes. In this way the invention displays the greatest sign area possible for the least material used in the sign holder 12.

Figure 5:
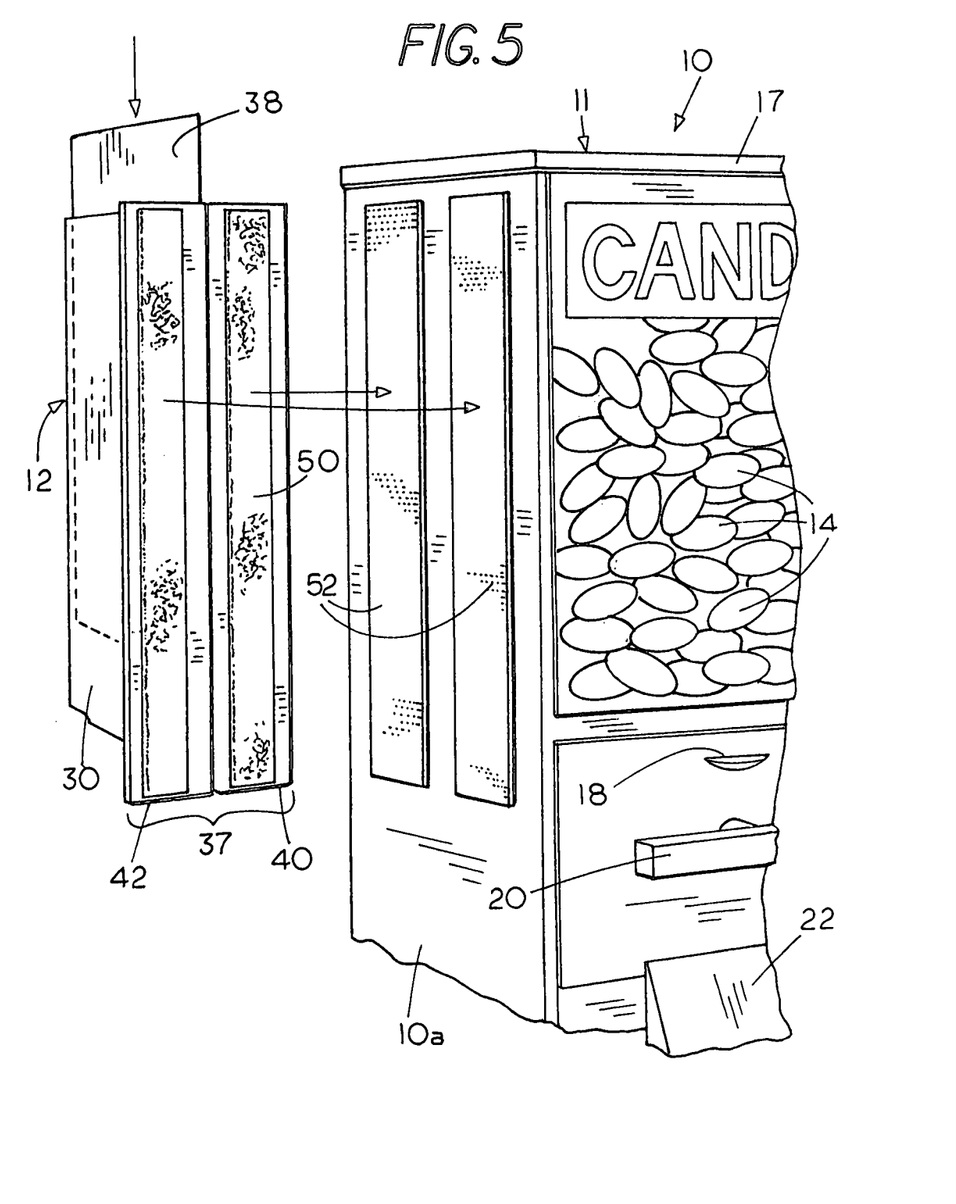
FIG. 5 is a partial perspective view of a vending machine just as an advertising display is being mounted on one side thereof.
Figure 6:
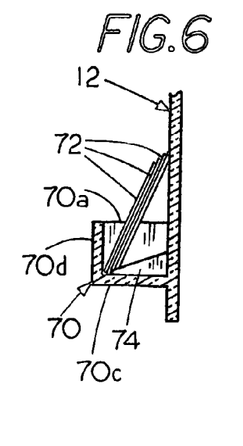
FIG. 6 is a vertical sectional view taken on line 6-6 of FIG. 3.
Figure 7:
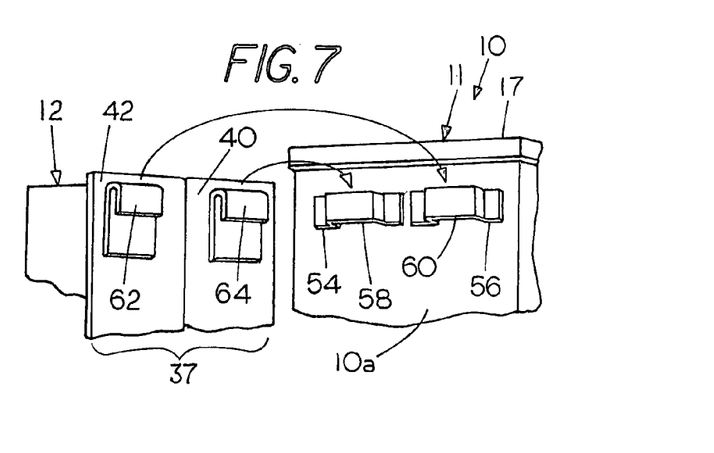
FIG. 7 is a view similar to FIG. 5 showing an alternate way of removably mounting an advertising display.

While sizes can vary greatly, typical sign holders 12 hold advertisements that are about 8½" to about 15" on a side but ads could be of other dimensions. The sign holders 12 can be conveniently mounted on the vending machine 11 by a removable connector fasteners such as hook and loop (Velcro™) fastener squares 44 that are bonded to the stabilizers 40, 42 and during use are connected to Velcro patches 46 which are bonded to the vending machine, e.g. by adhesive. FIG. 5 shows a sign holder 12 which is removably connected to the vending machine 11 by hook and loop strips 50 and 52 to provide a stronger removable connection. The sign holders 12 can be formed from any suitable transparent or translucent plastic such as an acrylate plastic, e.g. Lucite, but can be formed from any translucent, transparent plastic material or glass or as will be described below, a sheet of advertising copy can be applied, e.g. bonded to the front of a single panel.

Where lighter weight sign holders are used small pieces such as the squares of Velcro can be employed but for heavier sign holders the strips 50 and 52 (FIG. 5) extending the full length of the stabilizer 37 can be used. Other forms of removable fasteners can be employed (FIG. 7) such as brackets 54 and 56 which are welded, adhesively bonded, riveted, or otherwise securely fastened to the sidewall 10a of the vending machine 10 to provide slots 58 and 60 for metal hooks 62 and 64 which are fastened securely to the stabilizer 37 of the sign holder 12 so that the sign holder can be mounted by sliding the hooks 62 and 64 downwardly into the slots 60 and 58 respectively on the sidewall of the vending machine 10.

Typically there are three to six ads connected to one vending machine 10. For example, in the version shown in FIG. 1 there are four advertisements, one each on the top and left side of the candy machine measuring 13"×11" and two on the right side each measuring 7½"×11" so that the entire sign holder 12 on the right is 11" wide and 15" high with two dispensers 70, the upper one for the "vacation" sign and the lower one for the "honeymoon" sign. The other sign holders each have one advertisement and one take-away card dispenser.

Figure 8:
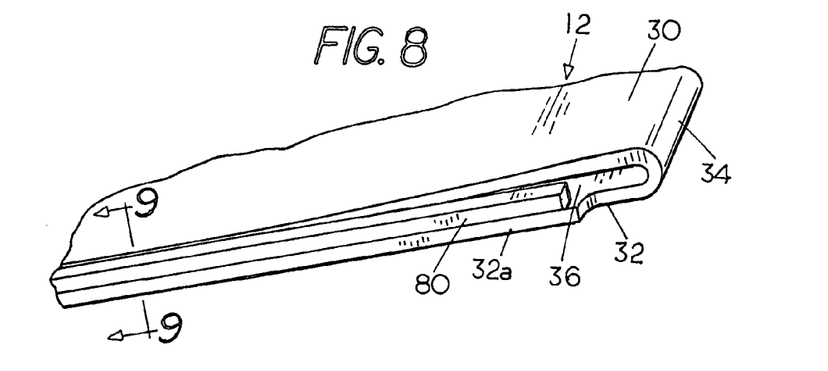
FIG. 8 is a partial bottom perspective view of an advertising display sign cover.
Figure 9:
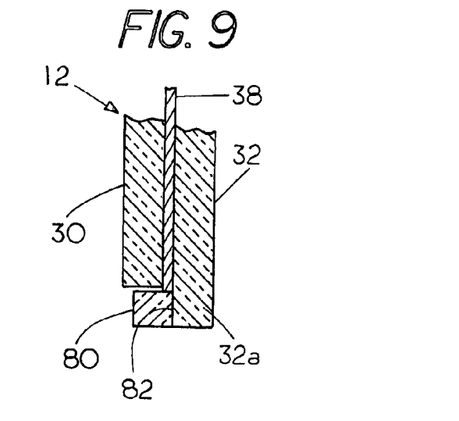
FIG. 9 is a cross-sectional view taken on line 9-9 of FIG. 8 on a larger scale.

It will be noted that the front and rear panels 30 and 32 of each of the sign holders 12 are connected only by a 180° bend 34 at the free outer edge so that the panels 30 and 32 as well as stabilizer members 40 and 42 can be moved toward or away from one another. This allows the depth of the compartment 36 between the panels to be varied, enabling the sign holder 12 to accommodate signs of various compositions or thicknesses or to hold several sign that can be used sequentially over a period of time or even a stack of signs that may be as much as ⅛" or more in thickness. Moreover, in spite of how much material is placed in the chamber 36 between the panels 30 and 32, the stabilizer members 40, 42 can be reliably connected by the hook and loop fastening squares or strips to corresponding sheets of fastener material that are attached to the vending machine 10. As best seen FIGS. 8 and 9, a retainer, e.g., retaining strip 80 is bonded at 82 to the lower portion 32a of the back panel 32 in position to project forwardly beneath the front panel 30 so as to prevent the sign or other printed sheet material 38 from slipping out of the bottom of the sign holder 12. Since the retaining strip 80 is not connected to the front panel 30, the front and rear panels can be spread apart somewhat whenever needed to accommodate thicker material yet strip 80 will reliably prevent the sheet 38 from falling out.

As best seen in FIGS. 1-4 and 6, a card dispenser 70 is integrally molded or bonded on the front surface of the sign holder 12 for holding a stack of cards 72 in proximity to the advertisement so that each card is exposed in position to be grasped manually by a customer allowing it to be taken away for facilitating a response to the advertisement by serving as a reminder without the need for memorizing or writing down information as in the case of a billboard, radio, or television advertisement. The dispenser 70 comprises a tray having two sidewalls 70a and 70ba, bottom wall 70c, a front wall 70d and a back wall which is a lower portion of the front panel 30 of the sign holder 12. Inside the tray are two or more inclined ramps 74 that support the cards 72 so that they are spread out vertically with their tops at different heights to enable them to be more easily picked up by the customer. The cards preferably contain critical printed information about the corresponding adjacent advertisement within the same sign holder and most preferably comprise a small or miniature version of the advertisement so the customer can easily respond to the ad without writing down information. The card also serves as a reminder of the ad when the customer reaches home. In this way, the invention encourages interest and response to the advertisement in four ways: first, by attracting the customer through an instinctive interest or hunger for food, particularly snacks containing carbohydrates; second, it places the customer directly in front of the pedestal 28 of the machine close to the candy or snack tray 24 where the printed advertisements within the sign holders 12 can be easily seen; third, it dispenses cards so that each card can be easily taken home by the customer to remind him or her of the advertisement as well as providing critical information for locating the advertiser; and fourth, it associates the take-away cards in the dispenser 70 with the corresponding ad by locating the dispenser for that card in proximity to the adjacent ad and optionally by providing a smaller version of the advertisement. Alternatively, the dispensers 70 for the take-away card 72 can be closed-top cardholders with a slot for removing each card and a finger-sized notch provided to enable a customer to slide one of the cards through the slot.

Figure 10:
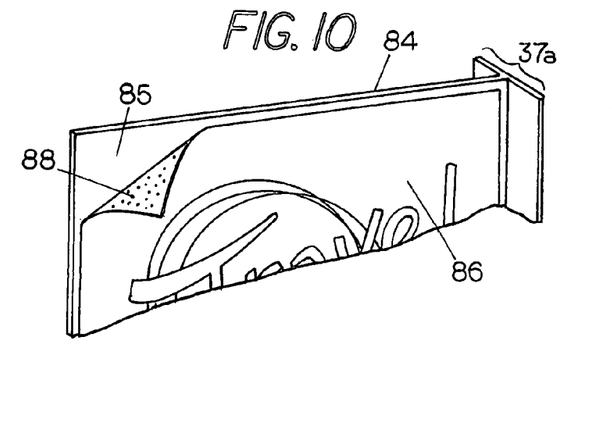
FIG. 10 is a partial perspective view of an alternate sign support.

Refer now to FIG. 10 which shows another embodiment of the invention in which a stabilizing plate designated 37a is integral with a single panel 84 that can be formed from any suitable material such as plastic, metal, or other suitable material having forward surface 85 facing the position taken by the customer to which an advertisement or other printed indicia provided on a sheet 86 is removably bonded to the front surface 85 of the supporting panel 84, for example by a pressure-sensitive adhesive 88 that is applied to the back of sheet 86 so that it will adhere once placed on the panel 84 but can be removed whenever convenient. This form of the invention is suitable where the printed copy has a glossy surface or has durable wearing qualities but unlike the prior embodiment is able to hold only a single sheet.

Figure 11:
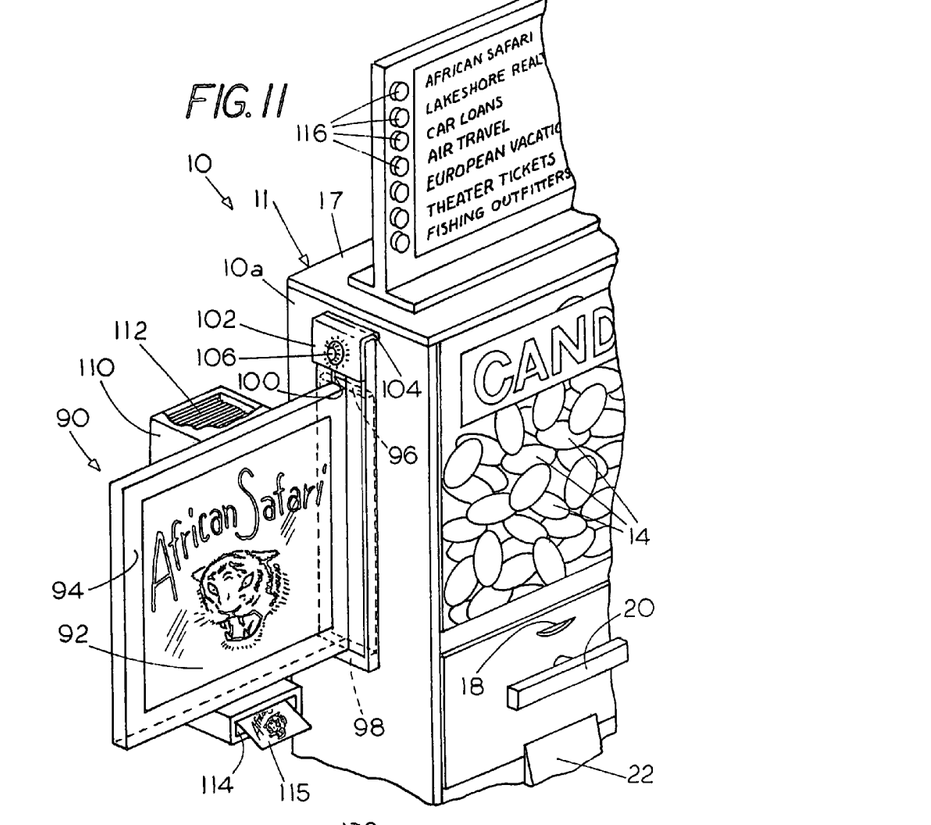
FIG. 11 is a partial perspective view of another form of the invention.
Figure 12:
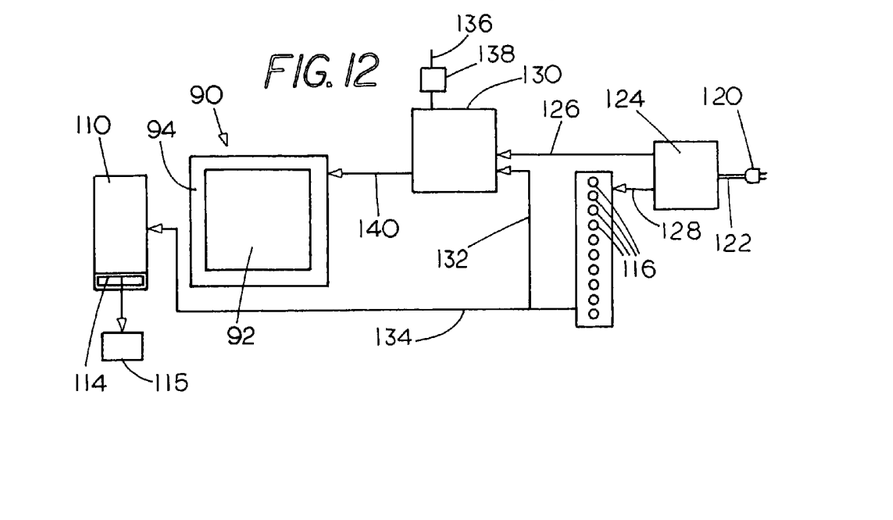
FIG. 12 is a schematic circuit diagram of the apparatus of FIG. 11.

Refer now to FIGS. 11 and 12 which illustrate another embodiment of the invention. In this case, the candy machine 11 is provided on one or more surfaces with an electronic video display 90 comprising a digital display screen 92 mounted within supporting frame 94 to play a video advertisement in a direction facing forwardly toward a position taken by the customer in front of the vending machine 11. The advertising display 90 can be a DVD loop that is updated periodically, an advertisement from cable from the world wide web, from a wireless transmission or other digital or analog video material, typically one or more advertising segments that are unrelated to the candy 14 or other snack being dispensed. The display 90 is provided with a stabilizer comprising a rectangular plastic or metal plate 96 at right angles to the display 90 that is slidably mounted within a chamber 98 provided with a vertical slot 100 through which the display 90 extends. For security purposes, the display 90 is held in place by a cover 102 which can be lifted upwardly about a horizontal pivot 104 when combination lock 106 is unlocked to enable the supporting stabilizer 96 to be slid upwardly out of the top of the compartment 98 whenever required.

Connected to the back of the advertising support 90 is a storage container 110 for storing stacks of cards 112 (visible where the container 110 is partly broken away) and having a dispensing outlet at its lower end just below the display holder 90. On the top wall 17 of the candy machine is mounted another display which in this instance is a selection panel having several electrical selector switches 116 for enabling the customer to interact with the device by selecting any advertisement that may be of interest such as "African Safari" or "Lakeshore Realty" etc. by pushing a corresponding selector switch 116, in this instance a push button just to the left of the subject selected. The advertising display 90 is wired to then display the selected advertising segment on the screen 92. Alternatively, the switches 116 and selection panel can extend across display holder 90 below screen 92 if desired.

Refer now to FIG. 12 which illustrates diagrammatically suitable electrical circuitry for display 90. Current is supplied by a wall plug 120 through conductors 122 to a power supply 124 to provide electrical power via conductors 126 and 128 to a DVD player 130 which is controlled by the selector switches 116 through cable 132 and to the dispenser 110 through cable 134 to dispense a corresponding take-away card 115 from dispensing outlet 114. Alternatively, video feed can be provided from the internet or from a cable connection through line 136 then through interface 138 via the outlet cable of DVD player 130 shown at 140 so that screen 92 will display either a recorded sequence from the DVD player 130 or an internet or cable feed provided through line 136 and interface 138. As the video display segment is played, a corresponding card 115 is selected and dispensed from the dispensing outlet 114 of the dispenser 110 by a signal sent through line 134 to the dispenser 110 so that the customer is able to take away a card 115 most preferably printed with a miniature version of the advertising segment that is being displayed and including pertinent information concerning the advertiser, e.g. address, telephone number, and website address. If desired, a wireless connection can be established where a central location at an outside site has a suitable modem box. The vending machine 11 then requires only a miniature CPU unit as in a computer in which a CD is loaded for downloading appropriate software to activate a small antenna to receive a wireless signal. An optional alternative to the switches 116 is a touch screen 92 or icon button as a selector switch for selecting an ad and to dispense a corresponding card 115.

In FIG. 11, the advertisement is displayed in electronic video format. The video electronics shown and described in FIGS. 11 and 12 is capable of providing more revenue for the owner of the candy dispenser video display according to the invention by making it possible to include more advertisers at each installation of the invention. For example, one candy machine may have two video displays, one on each side of the machine 10 and each may have the capacity of displaying a dozen or more video format advertising segments. Thus, two dozen advertisements may be carried by a single candy or snack dispenser 10 and as each advertisement is displayed, one of the corresponding take-away cards is dispensed providing information matching the particular advertising segment being displayed.

While the sign holders 12, or display 90 in the case of FIGS. 11 and 12, can be of any suitable size such as 11"×15" or 11"×13", the take-away card dispensers 70 are of a much smaller size, e.g. about 3¾" long for holding cards that about 3½" in length. The invention thus provides alternative advertising to gain the attention of a captive audience of customers engaged in their daily routine and attracted by the hunger instinct to the candy display. The invention is particularly useful in retail stores such as drugstores, supermarkets, etc., and restaurants but can be used in a variety of locations.

The invention is also durable, rugged in construction, low cost, and easy to set up or to change whenever required. It is unusually low in cost as judged by the ratio of cost to number of customers exposed and responses received. For example, a typical advertiser pays about $95 for a small advertisement and $150 for a large advertisement to run for one month. Thus, the invention will cost an advertiser approximately $95-$150 per month versus the expense of direct mail piece that will cost the same advertiser approximately $2,000-$3,000 per month.

The average grocery store has between 15,000 and 30,000 customers each week and spends approximately $20,000 a week for their own marketing. The invention is able to advertise to prospects in grocery stores and other stores close to their own home and allows people to see an advertising message day and night, seven days a week. The invention will be in a store every time a prospective customer shops (an average of 2-3 times per week for a grocery store, each visit averaging 45-60 minutes). Moreover, 85% of supermarket customers live within six miles of the store they visit. A.C. Nielsen Co. reports that Americans are seven times more likely to visit a supermarket than a convenience store and three times more likely to visit a supermarket than anywhere else in their community. The invention is especially well suited for use in supermarkets and restaurants, both of which are centered around food, but it can be used anywhere, e.g. car repair or oil change shops.

For many years it was simply the traditional media, like television, radio, newspaper and direct mail that handled the bulk of advertising material. However, advertisers now realize that new ways need to be found to place their message where it can be seen while potential customers are out of their homes going about their daily routine. Traditional media lose their effectiveness especially since the price of standard advertising methods are skyrocketing at a much faster rate than the results which they are able to yield. Consequently, the present invention provides a new advertising invention that can change the landscape of the advertising world and offer a groundswell of opportunity in the field of alternative advertising media that is already gaining momentum at a rapid pace. By contrast, people have become so irritated by in-home solicitations that many have placed telemarketers on "no call" lists. The present invention, on the other hand, provides an inexpensive advertising medium that reaches a large audience for a very affordable price without offending people.

Results of Example Runs Conduced Comparing the Invention with Controls

The invention will be better understood by reference to the following examples. One aspect of the invention is a combination candy/snack vending machine and advertising display. To determine the effectiveness of the combination advertising display and vending machine for candy or other snack, four runs were conducted in a supermarket, each run lasting four hours with three sign holders as shown in FIGS. 1-4 each measuring 11"×15". Care was taken to eliminate variables other than the device used for supporting the sign holders 12.

EXAMPLE 1

The Invention

Advertising sign holders attached to candy and snack vending machine as shown in FIG. 1
Number of consumers observed passing by the candy/snack machine: 958
Number of consumers that could be seen pausing at the candy machine: 162 (16.9%)
Number of take-away cards 70 that were taken by consumers: 17 (1.77%)
Number of consumers that put a quarter in the machine for candy or snack: 16

COMPARATIVE EXAMPLE 2

A test run was conducted under the same conditions as in Example 1 except that the vending machine was replaced by a metal post the same height as the candy machine. The following results were observed:
Number of consumers observed passing by the display: 879
Number of consumers that could be seen to pause at the display: 9 (1.02%)
Number of take-away cards that were removed from the card dispensers: 0

COMPARATIVE EXAMPLE 3

The same ads that were previously used in Examples 1 and 2 were placed on an advertising post supporting a community bulletin board for use by customers to place notes and ads at the entry of the supermarket.

Number of consumers observed passing by the community listing board supporting the advertising signs: 843
Number of consumers that could be observed to pause at the community advertising board: 1 (0.12%)
Number of take-away cards removed from the card dispenser: 0

COMPARATIVE EXAMPLE 4

A fourth run was conducted in which the same ads used in Examples 1-3 were placed on each side of a newspaper vending container holding a stack of newspapers offered for sale to customers.
Number of consumers observed passing by the newspaper container supporting the advertising signs: 150
Number of consumers observed to pause at the newspaper container supporting the advertising signs: 2 (1.33%)
Number of take-away cards removed from the card dispenser: 0

Summary of Results Obtained in Examples

The invention (Example 1) was a remarkable 16 times better than a metal support post (Example 2) in attracting customers, 140 times better than a bulletin board (Example 3) and unpredictably 12.7 times (1270%) better than a newspaper vending device (Example 4) from which no cards at all were taken.

Following the test run using the invention as shown in FIG. 1, grocery store customers were polled leaving the store with the following results: 81% responded that they did notice the advertising display on the candy and snack machine, 87% responded that they would potentially respond to the advertising, and 88% said that it would be an effective advertising means for reaching their attention.

Many variations of the present invention within the scope of the appended claims will be apparent to those skilled in the art once the principles described herein are understood.

What is claimed is:

1. An apparatus, comprising:
an electronic display attached to a top or side surface of a vending machine, the electronic display configured to display advertising content; and
a dispensing outlet configured to dispense cards or other printed material, wherein
the displayed advertising content comprises a video advertisement comprising a plurality of advertising segments, and
when an advertising segment is displayed, the apparatus is configured to select and dispense a corresponding card or other corresponding printed material from the dispensing outlet.

2. The apparatus of claim 1, wherein the electronic display extends horizontally outward from the vending machine.

3. The apparatus of claim 1, wherein a plurality of electronic displays are attached to a plurality of sides of the vending machine.

4. The apparatus of claim 1, further comprising:
a selection panel configured to modify the advertising content that is shown on the electronic display.

5. The apparatus of claim 4, wherein the selection panel comprises a plurality of selection switches, each switch is associated with different advertising content, and each switch changes the electronic display to show its associated advertising content when selected.

6. The apparatus of claim 1, wherein the displayed advertising content comprises a digital video disk (DVD) loop or an advertisement from the Internet, a cable feed, or a wireless transmission.

7. An apparatus, comprising:
three electronic displays configured to display advertising content, each electronic display attached to a vending machine; and
a dispensing outlet configured to dispense cards or other printed material, wherein
the three electronic displays extend outwardly from the top and side surfaces of the vending machine,
the displayed advertising content comprises a video advertisement comprising a plurality of advertising segments, and
when an advertising segment is displayed, the apparatus is configured to select and dispense a corresponding card or other corresponding printed material from the dispensing outlet.

8. The apparatus of claim 7, further comprising:
a selection panel configured to modify the advertising content that is shown on the electronic display.

9. The apparatus of claim 8, wherein the selection panel comprises a plurality of selection switches, each switch is associated with different advertising content, and each switch changes the electronic display to show its associated advertising content when selected.

10. The apparatus of claim 7, wherein the displayed advertising content comprises a digital video disk (DVD) loop or an advertisement from the Internet, a cable feed, or a wireless transmission.

11. An apparatus, comprising:
an electronic display attached to a top or side surface of a vending machine; and
a dispensing outlet configured to dispense cards, wherein
the electronic display is attached to a surface of the vending machine that is substantially orthogonal to a surface of the vending machine that contains a vending outlet, the electronic display extending outward from the vending machine,
the electronic display is configured to display advertising content that is unrelated to products contained within the vending machine,
the displayed advertising content comprises a video advertisement comprising a plurality of advertising segments, and
when an advertising segment is displayed, the apparatus is configured to select and dispense a corresponding card from the dispensing outlet.

12. The apparatus of claim 11, further comprising:
a selection panel configured to modify the advertising content that is shown on the electronic display.

13. The apparatus of claim 12, wherein the selection panel comprises a plurality of selection switches, each switch is associated with different advertising content, and each switch changes the electronic display to show its associated advertising content when selected.

14. The apparatus of claim 11, wherein a plurality of electronic displays are attached to a plurality of sides of the vending machine.

15. The apparatus of claim 11, wherein the displayed advertising content comprises a digital video disk (DVD) loop or an advertisement from the Internet, a cable feed, or a wireless transmission.

* * * * *